(12) United States Patent
Akaike et al.

(10) Patent No.: US 8,215,716 B2
(45) Date of Patent: Jul. 10, 2012

(54) BUCKLE STRUCTURE FOR VEHICLE SEAT

(75) Inventors: Fumitoshi Akaike, Aichi-ken (JP); Akari Takahashi, Kasugai (JP)

(73) Assignee: Toyota Boshoku Kabushiki Kaisha, Kariya-Shi (JP)

( * ) Notice: Subject to any disclaimer, the term of this patent is extended or adjusted under 35 U.S.C. 154(b) by 169 days.

(21) Appl. No.: 12/814,706

(22) Filed: Jun. 14, 2010

(65) Prior Publication Data
US 2010/0314930 A1    Dec. 16, 2010

(30) Foreign Application Priority Data

Jun. 16, 2009 (JP) ................. 2009-143441

(51) Int. Cl.
*A62B 35/00* (2006.01)
*B60R 22/00* (2006.01)
(52) U.S. Cl. ........................ 297/481; 297/468
(58) Field of Classification Search .......... 297/468, 297/481
See application file for complete search history.

(56) References Cited

U.S. PATENT DOCUMENTS

| | | | |
|---|---|---|---|
| 5,236,220 A * | 8/1993 | Mills | 297/481 X |
| 5,332,261 A * | 7/1994 | Siepierski | 297/481 X |
| 5,855,047 A * | 1/1999 | Haas | 297/468 X |
| 6,513,880 B2 * | 2/2003 | Yamaguchi et al. | 297/468 |
| 6,581,969 B2 | 6/2003 | Nishide | |
| 7,229,135 B2 * | 6/2007 | Hyatt et al. | 297/481 |
| 7,407,193 B2 * | 8/2008 | Yamaguchi et al. | 297/481 |
| 7,530,600 B2 * | 5/2009 | Di Grande | 297/468 X |
| 7,954,901 B2 * | 6/2011 | Foye et al. | 297/481 X |
| 8,061,781 B2 * | 11/2011 | Foye et al. | 297/481 X |
| 2006/0231317 A1 * | 10/2006 | Yamaguchi et al. | 297/481 X |

FOREIGN PATENT DOCUMENTS

| | | |
|---|---|---|
| JP | 5-105028 | 4/1993 |
| JP | 5-80925 | 11/1993 |
| JP | 6-59172 | 8/1994 |
| JP | 6-69028 | 9/1994 |
| JP | 7-267046 | 10/1995 |
| JP | 2002-137714 | 5/2002 |

* cited by examiner

*Primary Examiner* — Rodney B White
(74) *Attorney, Agent, or Firm* — Greenblum & Bernstein, P.L.C.

(57) ABSTRACT

A buckle structure of a vehicle seat includes: a seat belt that restrains an occupant; a tongue member that is provided at the seat belt; and a buckle member that is configured to lock the tongue member. The buckle member is disposed at a restraint position of the vehicle seat so that a protruding unit provided at the buckle member protrudes from the restraint position due to a pushing member, and when the tongue member is inserted into the buckle member, the tongue member is locked to the buckle member after the protruding unit returns to the restraint position against pushing forces of the pushing member.

5 Claims, 6 Drawing Sheets

BUCKLE STRUCTURE FOR VEHICLE SEAT

CROSS REFERENCE TO RELATED APPLICATION

The present application claims priority from Japanese Patent Application No. 2009-143441, which was filed on Jun. 16, 2009, the disclosure of which is herein incorporated by reference in its entirety.

TECHNICAL FIELD

The apparatuses and devices consistent with the present invention relate to a structure of a buckle for a vehicle seat.

BACKGROUND

Patent Documents 1 and 2 disclose a related art buckle structure. For example, the buckle structure disclosed in Patent Document 1 includes a seat belt that may restrain an occupant, a tongue member that is provided at the end of the seat belt, and a buckle member that may lock the tongue member.

Further, in the above-mentioned technique, a buckle member is disposed so as to be received in a recess of a seat cushion (a receiving portion formed below the lumbar portion of an occupant). In this way, it may be possible to prevent or suppress the separation of the buckle member from the seat cushion while improving the seat performance of a seat. Furthermore, in the above-mentioned technique, it may be possible to improve an occupant restraining force of the seat belt by disposing the buckle member in the receiving portion (below the lumbar portion of the occupant).

However, in the technique disclosed in Patent Document 1, it might be difficult to find the buckle member, which is received in the receiving portion, at first glance. Therefore, it takes an occupant a long time to lock the tongue member to the buckle member, which causes convenience to slightly deteriorate.

Meanwhile, Patent Document 2 discloses a technique for providing a buckle member at the side portion of the seat cushion through a link mechanism. The link mechanism includes first and second link arms (which are long plate-shaped members).

Further, in this technique, an upper end (rotating shaft) of the first link arm is rotatably supported by the side portion of the seat cushion. When the first link arm is rotated around the rotating shaft, a lower end of the first link arm ascends toward the front side of the seat from a position facing the lower side of a seat.

Furthermore, the second link arm is held on the side portion of the seat cushion while being inclined upward toward the front side of the seat. Moreover, a lower end of the second link arm is rotatably supported by a lower end of the first link arm, and the buckle member is attached at an upper end of the second link arm.

Further, in the technique disclosed in Patent Document 2, the upper end of the second link arm ascends toward the front side of the seat when the first link arm is rotated around the rotating shaft. Accordingly, the buckle member may be disposed so as to protrude from the surface of the seat cushion (the buckle member may be disposed so as to be conspicuous).

Furthermore, an occupant locks the tongue member to the buckle member after fastening the seat belt. Moreover, when the first link arm is rotated around the rotating shaft in a reverse direction, the upper end of the second link arm descends toward the rear side of the seat. Accordingly, it may be possible to maintain an occupant restraining force of the seat belt by disposing the buckle member below the surface of the seat cushion (below the lumbar portion of the occupant).

PATENT DOCUMENT

[Patent Document 1] JP-UM-A-5-80925
[Patent Document 2] JP-A-7-267046

SUMMARY

However, since the link mechanism (a plurality of members) was required in the technique disclosed in Patent Document 2, the buckle structure was caused to be complicated and increase in size.

The invention has been made in consideration of the above-mentioned disadvantages, and an object of the invention is to dispose a buckle member so as to make the buckle member more conspicuous while maintaining an occupant restraining force of a seat belt as much as possible, with a simple structure.

According to an illustrative aspect of the present invention, there is provided a buckle structure of a vehicle seat comprising: a seat belt that restrains an occupant; a tongue member that is provided at the seat belt; and a buckle member that is configured to lock the tongue member, wherein the buckle member is disposed at a restraint position of the vehicle seat so that a protruding unit provided at the buckle member protrudes from the restraint position due to a pushing member, and when the tongue member is inserted into the buckle member, the tongue member is locked to the buckle member after the protruding unit returns to the restraint position against pushing forces of the pushing member.

Further, according to another illustrative aspect of the present invention, there is provided a buckle comprising: a buckle member that is configured to lock and release a tongue member that is attached on an end of a seat belt; a cover member that is configured to cover the buckle member, the cover member configured to be movable between a first position and a second position, the first position in which the cover member is protruded from a surface of a seat, the second position in which the cover member is disposed in a position closer to the surface of the seat than the first position; a pushing member that is disposed between the buckle member and the cover member, wherein when the tongue member is not locked with the buckle member, the cover member is disposed in the first position, and wherein when the tongue member is locked with the buckle member, the cover member is disposed in the second position.

According to the illustrative aspect of the present invention of the invention, it may be possible to dispose a buckle member so as to make the buckle member more conspicuous while maintaining an occupant restraining force of a seat belt as much as possible, with a simple structure. Further, according to the illustrative aspect of the present invention, it may be possible to more smoothly lock the tongue member to the buckle member.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Embodiments of the invention will be described below with reference to FIGS. 1 to 7. In each of the drawings, appropriately, the front side of a vehicle seat is denoted by reference letter F, the back side of the vehicle seat is denoted by reference letter B, the upper side of the vehicle seat is denoted by reference letters UP, and the lower side of the vehicle seat is denoted by reference letters DW.

Figure 1:
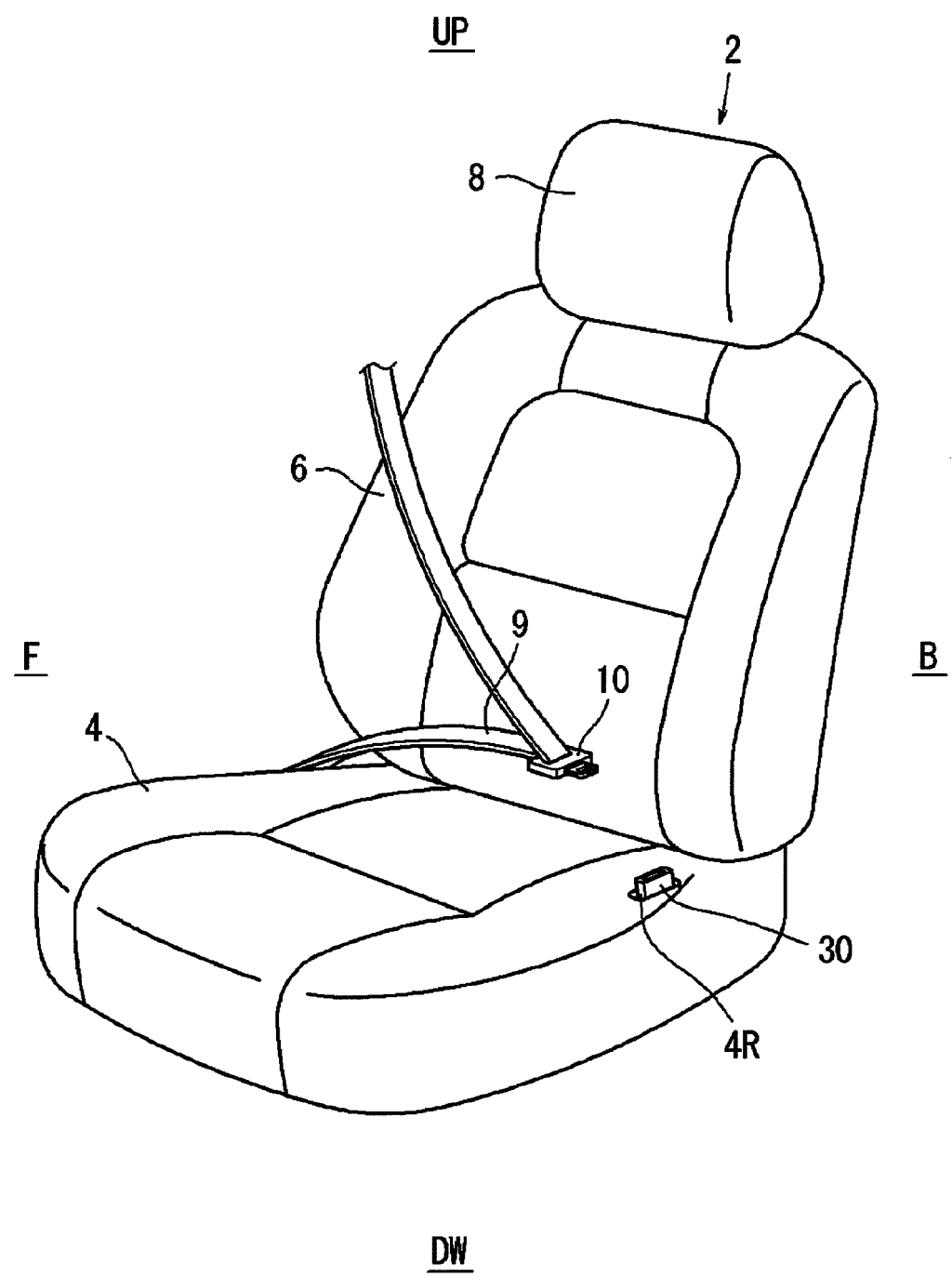
FIG. 1 is a perspective view of a vehicle seat.
Figure 2A:
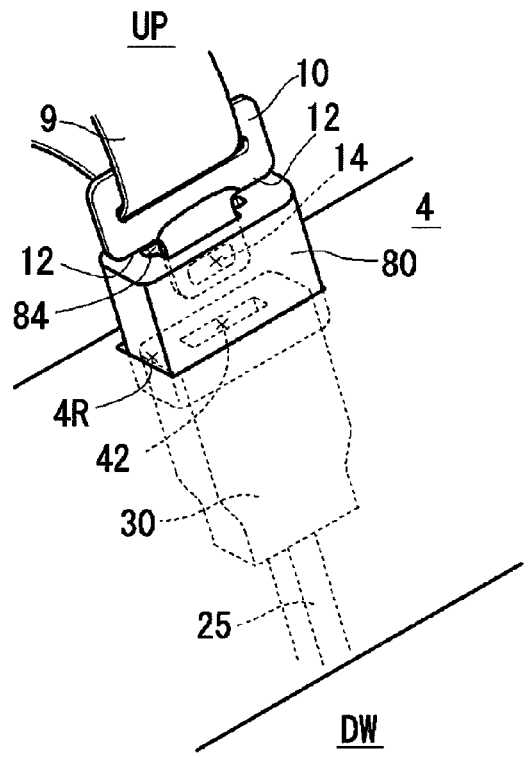
FIG. 2A is a side view of the buckle structure at a mounting position.
Figure 2B:
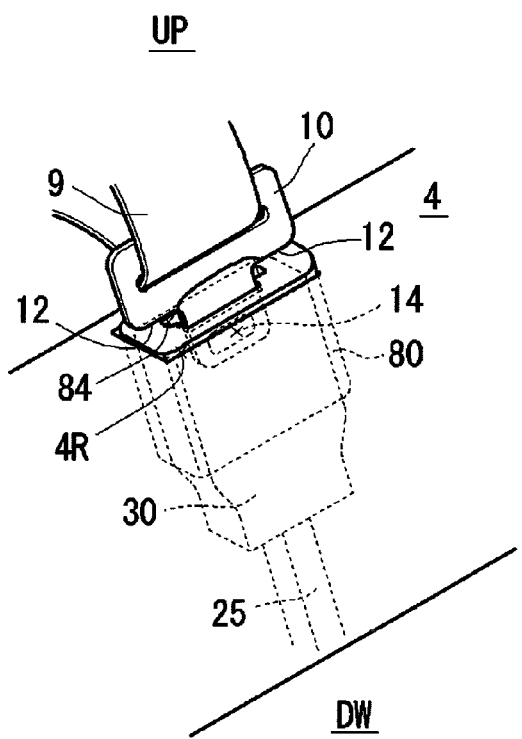
FIG. 2B is a side view of the buckle structure during receiving.

A vehicle seat 2 of FIG. 1 includes a seat cushion 4, a seat back 6, and a headrest 8. Each of these components includes a pad member P that forms the profile of the seat, and a surface material S that covers the pad member P (see FIG. 3).

Further, the seat cushion 4 is provided with a (strip-shaped) seat belt 9 that can restrain an occupant, and a buckle member 30 (to be described below). The seat belt 9 is provided with a tongue member 10 (to be described below). Furthermore, one end of the seat belt 9 is fixed to the other side of the seat cushion 4, and the other end of the seat belt 9 is fixed to the side of the seat back 6.

Moreover, an occupant (not shown) on the seat cushion 4 locks the tongue member 10 to the buckle member 30 after fastening the seat belt 9. In this kind of structure, it is preferable that the buckle member 30 be made conspicuous and the tongue member 10 be smoothly locked.

Further, in this exemplary embodiment, the buckle member 30 is made conspicuous while a force of the seat belt for restraining an occupant is maintained as much as possible by the following buckle structure.

First Exemplary Embodiment

A buckle structure of this exemplary embodiment includes a receiving portion 4R, a tongue member 10, a cover member 80 (protruding unit), pushing members 20, and a buckle member 30 (see FIGS. 1 to 4). The tongue member 10 is a flat plate member having a convex shape (in front view), and includes a pair of pressing portions 12 that protrudes toward both sides. Further, a substantially rectangular locking hole 14 is formed at the center of the tongue member 10.

Further, the buckle member 30 is received in the receiving portion 4R (at a restraint position) while being covered with the cover member 80. Furthermore, the cover member 80 protrudes from the receiving portion 4R through the pushing members 20 so as to be disposed at a more conspicuous mounting position. Each component will be described below.

(Receiving Portion)

Figure 3:
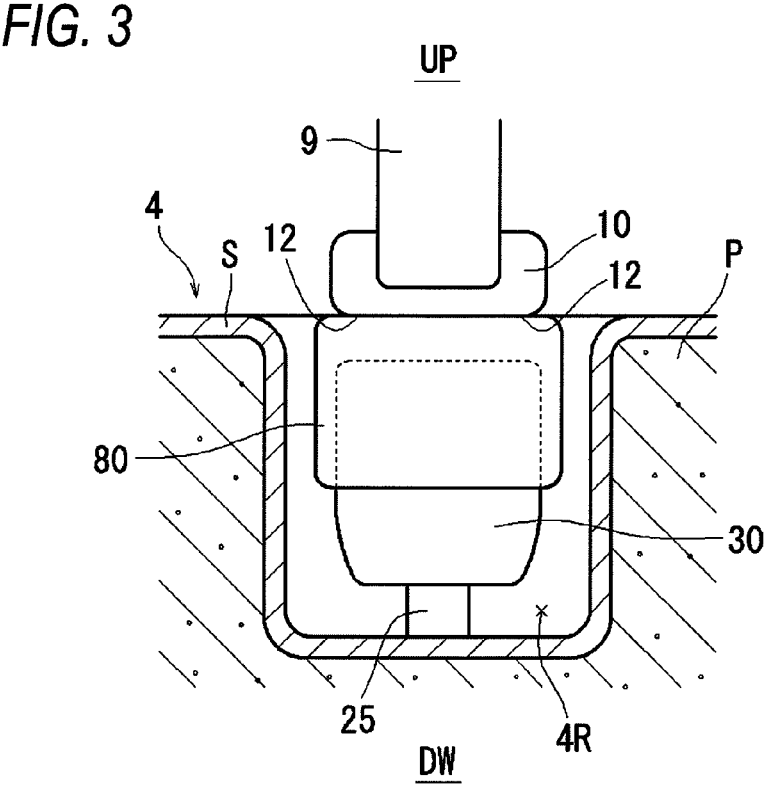
FIG. 3 is a side view of the buckle structure at a restraint position.

The receiving portion 4R is a recess that has dimensions (the dimensions of an opening and depth) sufficient to receive the buckle member 30, and includes a support member 25 that can support the buckle member 30 (see FIG. 3).

In this exemplary embodiment, the inner surface of the receiving portion 4R is covered with the surface material S after a substantially rectangular receiving portion 4R (recess) is formed on one side of the pad member P of the seat cushion 4 (below the lumbar portion of the occupant). Further, the support member 25 (having the shape of a plate or a rod) protrudes from the bottom of the receiving portion 4R, and the buckle member 30 is fixed to the upper end of the support member 25.

(Cover Member (Protruding Unit))

The cover member 80 (one example of a protruding unit) is a box-shaped body that can cover the entirety or a part of the buckle member 30 to be described below. The cover member 80 of this exemplary embodiment is a box-shaped body having a substantially rectangular shape (in front view), and has the outer dimensions sufficient to cover the upper portion of the buckle member 30 (see FIGS. 2 to 4).

Further, an insertion opening 81 through which the buckle member 30 is inserted is formed at the lower surface of the cover member 80, and a guide part 82 and a window portion 84 are formed at the upper surface of the cover member 80. The window portion 84 is a hole through which a release member 60 (upper surface) to be described below is exposed to the outside (see FIG. 6).

Furthermore, referring to FIG. 4, the upper inner portion of the cover member 80 (the periphery of the guide part 82 to be described below) is formed in a hollow shape, so that receiving spaces SP are formed. In this exemplary embodiment, the cover member 80 covers the buckle member 30 so that the following pushing members 20 are disposed in the receiving spaces SP.

(Guide Part)

Moreover, the guide part 82 is a portion that guides the tongue member 10 to the buckle member 30 (an insertion part 52 to be described below) (see FIGS. 4 and 6). The guide part 82 of this exemplary embodiment includes an opening 82h that is opened at the upper surface of the cover member 80, and guide portions 82g that form an inner wall.

The guide portions 82g are tapered inner walls between which the width is reduced from the opening 82h toward the insertion part 52. In this exemplary embodiment, all inner walls, which form the guide part 82, are referred to as the guide portions 82g. When the tongue member 10 is inserted along these guide portions 82g, the tongue member 10 is smoothly guided to the insertion part 52.

(Pushing Member)

Figure 4:
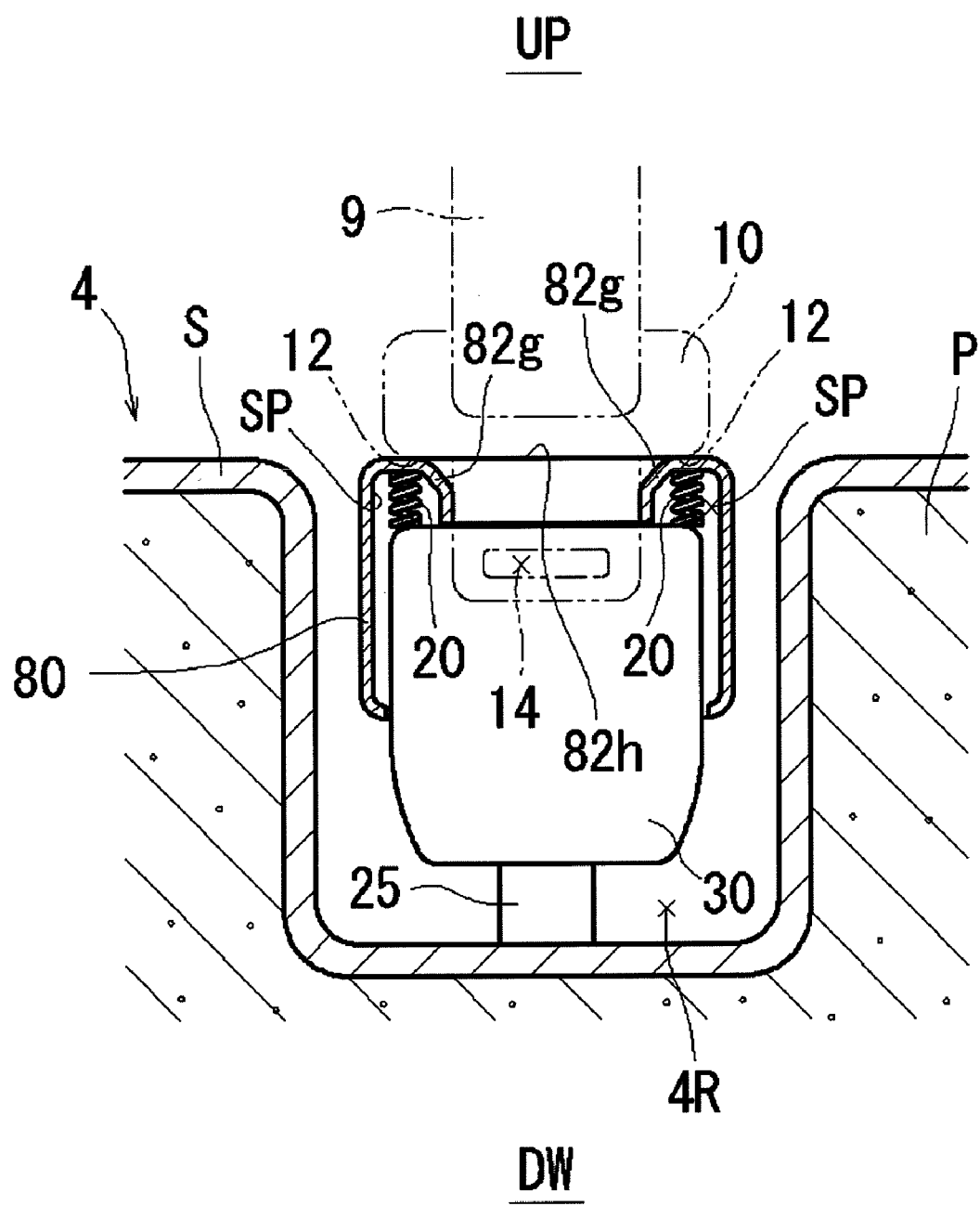
FIG. 4 is a side view of the buckle structure that shows the cross section of a cover member.

The pushing members 20 are members that elastically support the cover member 80 (see FIG. 4). For example, a spring member 59 (a coil spring, a leaf spring, or the like) or an elastic member (rubber, elastomer, or the like) having a rubber elasticity may be used as the pushing member 20.

Since the pushing members 20 (cylindrical coil springs) are received in the receiving spaces SP in this exemplary embodiment, the pushing members 20 are interposed between the cover member 80 and the buckle member 30. Further, since the cover member 80 is elastically supported by the pushing members 20, (the entirety of or a part of) the cover member 80 is disposed at a mounting position so as to protrude from the receiving portion 4R.

Furthermore, since the pushing members 20 are elastically compressed by an insertion force (pressing force) of the tongue member 10, (the entirety of or a part of) the cover member 80 is moved toward the buckle member 30 and is received in the receiving portion 4R (restraint position). In this case, it is preferable that the pushing member 20 have an elastic force so as to be relatively easily elastically compressed by the insertion force (pressing force) of the tongue member 10 through the appropriate selection of the length or material of the pushing member.

(Buckle Member)

Figure 5:
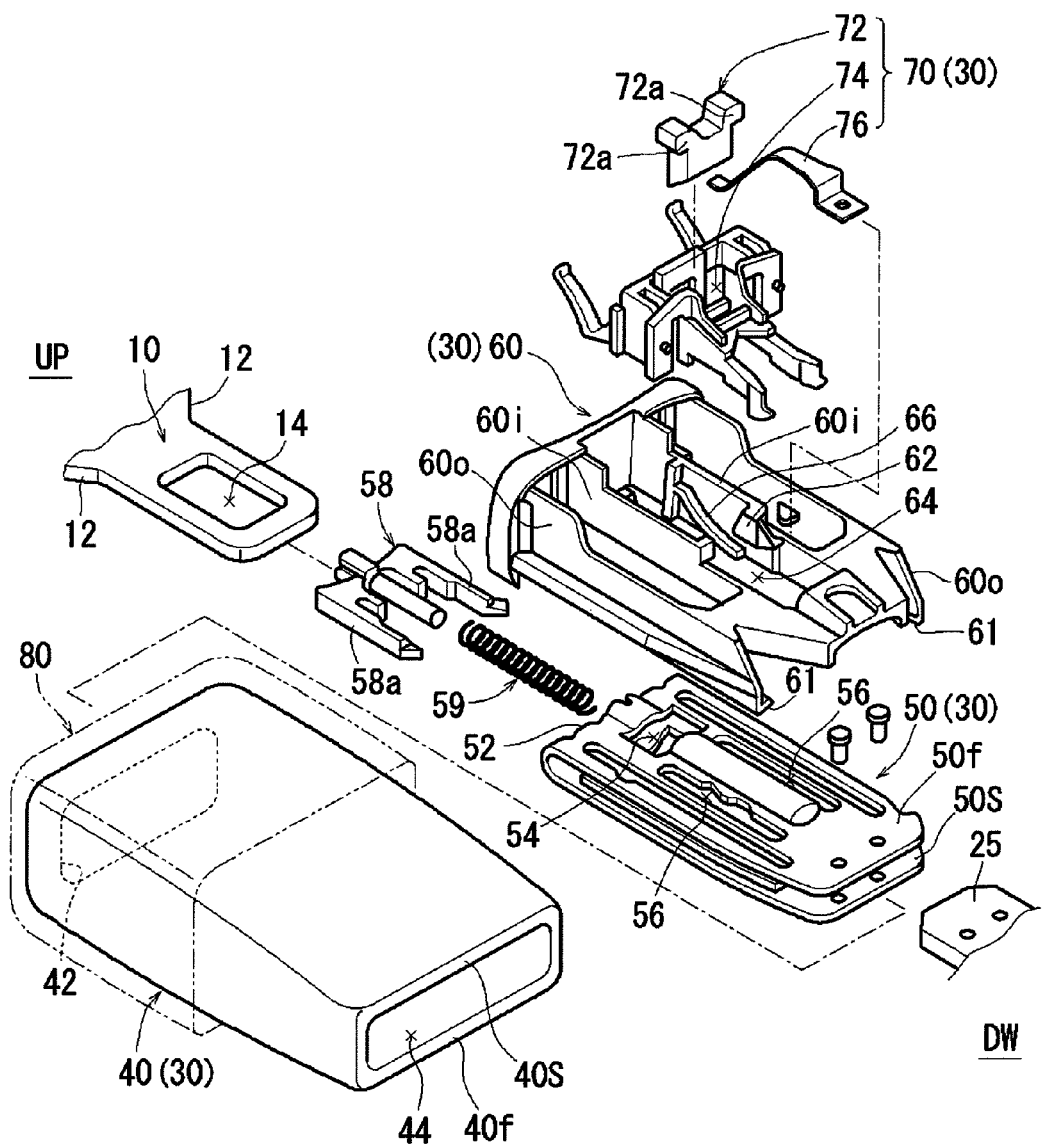
FIG. 5 is an exploded perspective view of a buckle member.
Figure 6A:
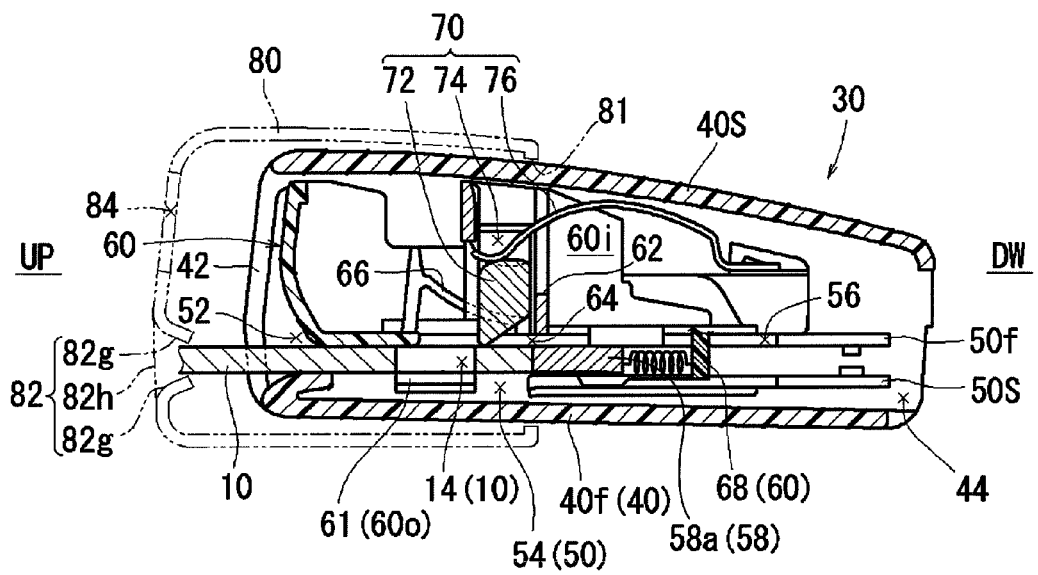
FIG. 6A is a longitudinal sectional view of the inner structure of the buckle member that is being locked.
Figure 6B:
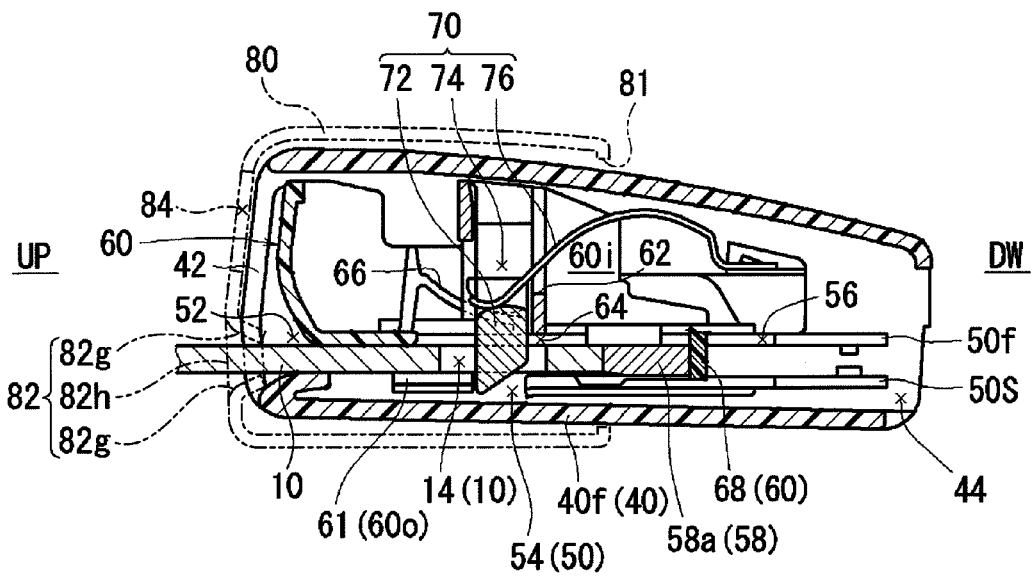
FIG. 6B is a longitudinal sectional view of the inner structure of the buckle member at the time of locking.

The buckle member 30 includes a case 40 and an internal structure (a plate member 50, a release member 60, and a locking member 70) received in the case 40 (see FIGS. 5 and 6). The case 40 of this exemplary embodiment is a box-shaped body that has a substantially rectangular shape (in front view), and includes a first wall 40f and a second wall 40s. An upper opening 42 into which the tongue member 10 may be inserted is formed at the upper end of the case 40, and a lower opening 44 into which the internal structure may be inserted is formed at the lower end of the case 40.

(Internal Structure)

The plate member 50 is a substantially U-shaped plate member (in side view), and includes a first side portion 50f and a second side portion 50s (all of the side portions have the shape of a flat plate) (see FIGS. 5 and 6). The plate member 50 is mounted on the inner surface of the first wall 40f so that the lower portion (release end) of the plate member faces the lower opening 44. Further, after the support member 25 is inserted from the lower end (release end) of the plate member 50, the upper portion of the support member 25 is fixed (fastened) to the inside of the plate member 50.

Further, an insertion part 52 into which the tongue member 10 may be inserted is provided at the upper end (connection end) of the plate member 50. Furthermore, the side of the plate member 50 is formed in the release shape, and the release member 60 to be described below is engaged with the plate member so as to be movable (slidable) in a vertical direction.

In addition, engaging holes 54 into which the locking member 70 to be described below is inserted are formed at the upper portions of the first and second side portions 50f and 50s. Further, long holes 56, which extend in the vertical direction, are formed at the lower portion of the first side portion 50f.

Furthermore, an injector 58 and a spring member 59 are provided inside the plate member 50 (between the first and second side portions 50f and 50s). The injector 58 is a member that has a substantially reverse U shape (in front view), and includes a pair of extension arms 58a that extends downward. The spring member 59 has the shape of a cylindrical coil, and is supported by the support member 25.

In this exemplary embodiment, the injector 58 is disposed above the above-mentioned long holes 56, and is pushed upward by the spring member 59. Further, the injector 58 is moved toward the long holes 56 against the spring member 59 by the insertion force (pressing force) of the tongue member 10.

The release member 60 is a box-shaped body that has a substantially rectangular shape (in front view), and includes a pair of outer plates 60o and a pair of inner plates 60i (see FIGS. 5 and 6). The pair of outer plates 60o (having the shape of a flat plate) is members that form both sides of the release member 60, and includes claw portions 61 that are bent inward.

Further, the pair of inner plates 60i is flat plate-shaped members that are disposed to face each other between the outer plates 60o.

Furthermore, each of the pair of inner plates 60i includes a stopper portion 62, an insertion hole 64, a release portion 66, and a leg portion 68. The insertion hole 64 is a hole into which the locking member 70 to be described below may be inserted. The stopper portion 62 is a protruding portion that is formed on the inner surface of the inner plate 60i, and is a portion that interrupts the movement of the locking member 70 in an insertion direction.

In addition, the release portion 66 is a protruding part that is formed on the inner surface of the inner plate 60i and has the shape of a slope, and forms a semicircular arc shape while including the stopper portion 62 as a bottom.

Further, the leg portion 68 is a cylindrical portion that protrudes toward the first wall 40f and is inserted into the above-mentioned long hole 56. Furthermore, in this exemplary embodiment, while the leg portion 68 of the inner plate 60i is inserted into the upper end of the long hole 56, the claw portion 61 of the outer plate 60o is engaged with the side portion of the plate member 50. In this way, the release member 60 may be slidably mounted on the plate member 50.

The locking member 70 is a box-shaped body that has a substantially rectangular shape (in front view). The locking member includes a latch member 72, a holding hole 74 holding the latch member 72, and a leaf spring member 76 (see FIGS. 5 and 6). The latch member 72 is a member that forms a substantially U shape, and includes a pair of arm portions 72a that protrudes to both sides.

Further, in this example, the latch member 72 is held at the holding hole 74 so that the latch member 72 may slide toward the inner plates 60i. Furthermore, the locking member 70 is mounted on the inner surface of the second wall 40s so that the latch member 72 is disposed so as to face the stopper portions 62. In this case, the latch member 72 comes into contact with the stopper portions 62 due to a pushing force of the leaf spring member 76.

Moreover, after being released from the contact with the stopper portions 62 by the sliding toward the lower side of the release member 60 (by the complete insertion of the tongue member 10), the latch member 72 enters the engaging holes 54 by the pushing force of the leaf spring member 76.

[Locking Operation]

Referring to FIG. 1, an occupant (not shown) on the seat cushion 4 inserts the tongue member 10 into the buckle member 30 after fastening the seat belt 9. In this case, the tongue member 10 is smoothly guided to the insertion part 52 by the guide part 82 (see FIGS. 4 and 6).

Further, the pressing portions 12 of the tongue member 10 come into contact with the cover member 80 and press the cover member 80 against the buckle member 30. The cover member 80 slides downward against the pushing forces of the pushing members 20 due to the insertion force (pressing force) of the tongue member 10, and is received in the receiving portion 4R (see FIG. 5).

Furthermore, referring to FIGS. 5 and 6, when the tongue member 10 is completely inserted into the buckle member 30, the injector 58 provided inside the plate member 50 is moved toward the long holes 56 while elastically compressing the spring member 59. Moreover, when the extension arms 58a of the injector 58 press the leg portions 68, the release member 60 slides downward. The contact between the latch member 72 and the stopper portions 62 is released by the sliding of the release member 60, so that the latch member 72 is inserted into the insertion hole 64 and inserted into the locking hole 14 of the tongue member 10. Accordingly, the tongue member 10 is engaged with the buckle member 30.

In this case, the cover member 80 is interposed between the tongue member 10 and the buckle member 30 and is received in the receiving portion 4R (see FIGS. 3 and 4). Since the cover member 80 is received in the receiving portion 4R well as described above, the surface of the seat cushion 4 is substantially flush with the cover member. As a result, the appearance and seat performance of the seat are improved.

[Release Operation]

It may be possible to separate the tongue member 10 from the buckle member 30 by pressing down the release member 60 that is exposed to the outside through the window portion 84 (see FIGS. 5 and 6).

If the release member 60 slides toward the lower side in this case, the arm portions 72a of the latch member 72 are moved along the release portion 66 (having the shape of a slope) and come off from the locking hole 14. Accordingly, the engagement between the tongue member 10 and the buckle member 30 is released.

Further, the tongue member 10 is discharged from the buckle member 30 by the injector 58, and the cover member 80 protrudes from the receiving portion 4R due to the pushing members 20.

As described above, according to this exemplary embodiment, the cover member 80 protrudes from the seat cushion 4 (the cover member is disposed at a more conspicuous mounting position). Accordingly, the position of the disposed buckle member 30 becomes more apparent. Moreover, in this exemplary embodiment, it may be possible to receive the cover member 80 in the receiving portion 4R well by an operation for locking the tongue member 10 to the buckle member 30 (by a relatively simple operation). Further, it may be possible to preferably maintain the occupant restraining force of the seat belt 9 by locking the tongue member 10 to the buckle member 30 in the receiving portion 4R (below the lumbar portion of the occupant).

Furthermore, in this exemplary embodiment, the cover member 80 is received in the receiving portion 4R when an occupant takes a seat. Accordingly, it may be possible to prevent or suppress the obstruction of the cover member 80 during seating, and to preferably maintain the seat performance of the seat.

Moreover, in this exemplar embodiment, it may be possible to make the position of the disposed buckle member 30 conspicuous by the cover member 80 without significant change to the buckle member 30 (for example, with the existing structure as it is).

In addition, since the guide part 82 is formed at the cover member 80 in this exemplary embodiment, it may be possible to more smoothly lock the tongue member 10 to the buckle member 30.

Further, if a member such as baggage is placed on the buckle member 30, the cover member 80 is received in the receiving portion 4R by a pressing force of the member. For example, in this exemplary embodiment, the cover member 80 hardly obstructs the placement of the member (the seat structure is easy to use).

Second Exemplary Embodiment

Since a vehicle seat 2a of this exemplary embodiment has substantially the same structure as the vehicle seat 2 of the first exemplary embodiment, common components are denoted by corresponding reference numerals and detailed description thereof will be omitted.

Figure 7:
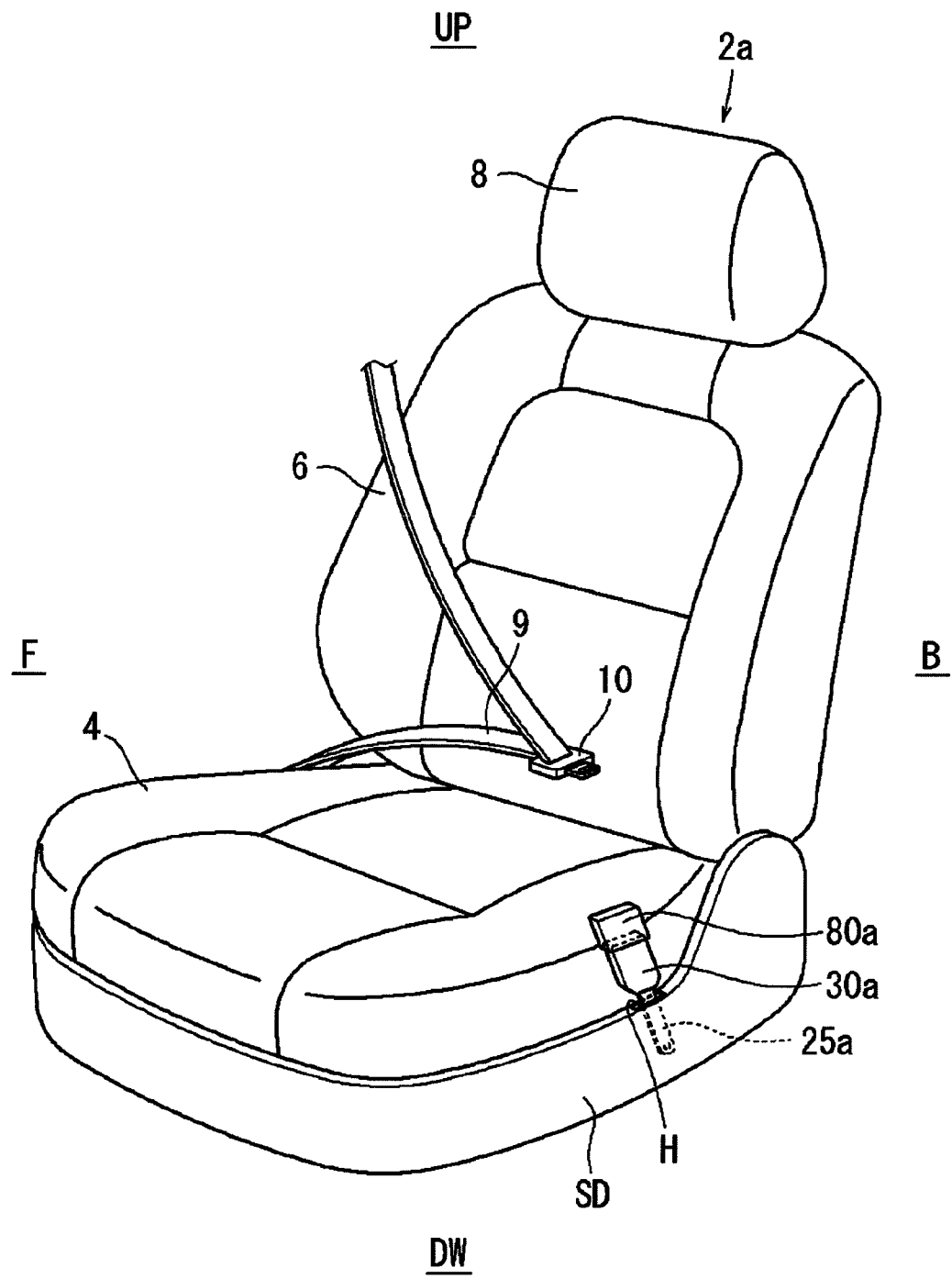
FIG. 7 is a perspective view of a vehicle seat of a second example.

In this exemplary embodiment, a buckle structure (a buckle member 30a, a support member 25a, a cover member 80a, and a pushing member) is mounted on the side portion of a seat cushion (see FIG. 7).

A shield member SD, which has a substantially U shape (in top view), is mounted on the lower portion of the seat cushion 4 of this example. An insertion hole H into which the support member 25a may be inserted is formed at the side portion of the shield member SD (below the lumbar portion of an occupant).

Further, the support member 25a is a flat plate member having a substantially rectangular shape. The buckle member 30a is fixed to the upper portion of the support member 25a, and the lower portion of the support member 25a is inserted and fixed to the insertion hole H. The buckle member 30a is disposed below the lumbar portion of an occupant (at a restraint position). In this case, it is preferable that the buckle member 30a be disposed immediately below the surface of the seat cushion 4.

Furthermore, the cover member 80a is mounted on the upper portion of the buckle member 30a with pushing members (not shown) interposed therebetween. In this way, the cover member 80a may protrude from the surface of the seat cushion 4 so as to be disposed at a more conspicuous mounting position.

Moreover, it may be possible to dispose the cover member 80a at the restraint position by inserting the tongue member 10 into the buckle member 30a. Further, it may be possible to preferably maintain the occupant restraining force of the seat belt 9 by locking the tongue member 10 to the buckle member 30a immediately below the surface of the seat cushion (below the lumbar portion of the occupant).

The buckle structure for a vehicle seat according to this embodiment is not limited to the above-mentioned embodiment, and may have various other modifications.

(1) In this exemplary embodiment, the pushing members 20 have been provided in the receiving spaces SP. However, the positions of the pushing members 20 are not to be limited. For example, the pushing members 20 only have to elastically support the cover member 80, and may be interposed in various gaps between the cover member 80 and the buckle member 30. Further, as long as the pushing members 20 do not obstruct the engagement of the buckle member 30, the pushing members may be provided on the inner wall or bottom of the receiving portion 4R.

(2) Furthermore, one structure of the buckle member 30 and the tongue member 10 has been exemplified in this embodiment. However, the structure of these members is not to be limited. That is, various buckle members 30 and tongue members 10 of an existing structure may be used in this example as they are (or without significant change).

Moreover, the shape of the cover member 80 may be appropriately modified according to the shape of the buckle member 30. Further, the number of the buckle members, the tongue members, the pushing members, and the receiving portions may be one or more.

(3) Furthermore, in the first exemplary embodiment, the cover member 80 has been received in the receiving portion 4R (at the restraint position) so as to be substantially flush with the surface of the seat cushion 4. The cover member 80 corresponding to the restraint position may protrude from the receiving portion 4R and be received in the receiving portion 4R not so as to have an extremely bad influence on the occupant restraining force or the seat performance of the seat.

Moreover, in the second exemplary embodiment, the cover member 80 corresponding to the restraint position has been disposed immediately below the surface of the seat cushion. The cover member 80 corresponding to the restraint position may protrude from the surface of the seat cushion 4 so as not to have an extremely bad influence on the occupant restraining force or the seat performance of the seat.

(4) In addition, the guide portions 82g have been formed on the inner wall of the guide part 82 in this embodiment. It is preferable that at least one guide portion 82g be formed on the inner wall of the guide portion 82. Further, the shape of the guide portion may be various tapered shapes of a slope, such as a linear slope, a concave curve, or a convex curve.

(5) Furthermore, in this embodiment, the cover member 80 has been exemplified as the protruding unit. The cover member 80 may protrude from the receiving portion 4R and may be formed of, for example, a cylindrical member of which both ends are opened (without the guide part 82).

(6) Moreover, various members, which can protrude from the receiving portion 4R, may be used as the protruding unit. That is, in addition to the cover member 80, protruding units having various shapes, such as a rod-shaped member, a plate-shaped member, and a cylindrical member (a cylindrical material of which both ends are opened) may be employed as the protruding unit.

Further, the protruding unit may be received in the buckle member 30 by the pressing force of the tongue member 10. Furthermore, the protruding unit may be formed on the outer surface of the buckle member 30 so as to slide downward due to the pressing force of the tongue member 10.

(7) Moreover, the receiving portion 4R has been formed at the seat cushion 4 in this exemplary embodiment. The receiving portion may be formed at any position on the seat cushion 4, the seat back 6, and the headrest 8 in accordance with the circumstances of the disposition of the seat belt 9. In addition, the receiving portion may be formed between the seat cushion and the seat back.

Further, the end of the seat belt 9 may be fixed to any one of the seat cushion 4, the seat back 6, and the headrest 8, and may be fixed to various kinds of vehicle structures such as a door. Furthermore, the tongue member may be provided at one end of the seat belt 9.

(8) Moreover, an occupant has been directly restrained by the seat belt in this embodiment. The seat belt may restrain, for example, a child seat (indirectly restrain an occupant on a child seat). In this case, the seat belt is fastened by an operation for receiving the buckle member. Accordingly, it may be possible to more reliably restrain and fix a child seat.

(9) Moreover, the buckle member 30 can be configured to be released from the tongue member 10 when the cover member 80 disposed in the position shown in FIG. 28 is pushed toward the seat side (buckle side).

What is claimed is:

1. A buckle structure of a vehicle seat comprising:
   a seat belt that restrains an occupant;
   a tongue member that is provided at the seat belt; and
   a buckle member that is configured to lock the tongue member,
   wherein
   the buckle member is disposed at a restraint position on the vehicle seat so that a protruding unit provided on the buckle member at a mounting position protrudes from the buckle member a predetermined distance from the restraint position due to a pushing member, and
   when the tongue member is inserted into the buckle member, the tongue member is locked to the buckle member after the protruding unit moves toward the buckle member to the restraint position against pushing forces of the pushing member.

2. The buckle structure of a vehicle seat according to claim 1,
   wherein
   the protruding unit is a cover member that is configured to cover the entire or a part of the buckle member, and
   the tongue member is guided to an insertion part of the buckle member by a guide part provided at the cover member.

3. The buckle structure of a vehicle seat according to claim 2,
   wherein
   when the cover member is disposed in the restraint position against pushing forces of the pushing member, the cover member is disposed below a surface of the vehicle seat.

4. A buckle comprising:
   a buckle member that is configured to lock and release a tongue member that is attached on an end of a seat belt;
   a cover member that is configured to cover the buckle member, the cover member configured to be movable between a first position and a second position, the first position in which the cover member is protruded from a surface of a seat, the second position in which the cover member is disposed in a position closer to the surface of the seat than the first position;
   a pushing member that is disposed between the buckle member and the cover member,
   wherein when the tongue member is not locked with the buckle member, the cover member is disposed in the first position, and
   wherein when the tongue member is locked with the buckle member, the cover member is disposed in the second position.

5. The buckle according to claim 4,
   wherein when the cover member disposed in the second position is pushed toward the buckle member, the tongue member is released from the buckle member.

* * * * *